3,535,037
VARIABLE MAGNIFICATION EXPOSURE DEVICE
FOR A REPRODUCTION APPARATUS
Yutaka Koizumi, Tokyo, Japan, assignor to Kabushiki
Kaisha Ricoh, Tokyo, Japan
Filed Sept. 20, 1968, Ser. No. 761,123
Claims priority, application Japan, Sept. 29, 1967,
42/62,691
Int. Cl. G03b 27/24
U.S. Cl. 355—57                                    4 Claims

ABSTRACT OF THE DISCLOSURE

A reproduction apparatus comprises a housing with an aperture surmounted by a transparent plate for an original to be reproduced, the housing being divided into a first optical path chamber, a second optical path chamber, a photosensitive paper chamber and a developer chamber. A first movable reflection mirror and a light source are positioned in the first optical path chamber, and a second movable reflection mirror is positioned in the second optical path chamber facing the surface of the photosensitive paper. A reproduction lens system is fixed in the housing between the first optical path chamber and the second optical path chamber to transmit the image from the first mirror to the second mirror. The first and second mirrors are respectively movable towards and away from the lens system in opposite directions to each other so that variable magnification of reproduction can be obtained.

---

The invention relates to a variable magnification exposure device for a reproduction apparatus in which the magnification of reproduction is varied by fixing an original and photosenstive paper and moving two movable reflection mirrors placed in the optical path of reproduction in opposite directions.

In the existing reproduction apparatus, in order to vary the magnification, an original and photosensitive paper are moved back and forth in unison with respect to a fixed lens. Such a mechanism is not only complex in structure but not easy to handle as the original must be moved. Further, its movable parts are large in size and the device is subject to breakage by external shocks because the movable parts are outside the housing.

It is, therefore, an object of the invention to provide a variable magnification exposure device which is simple and strong in structure and easy to handle.

Figure 1:
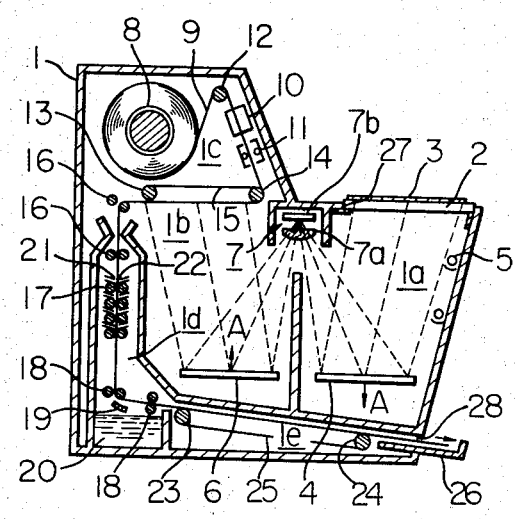
Figure 2:
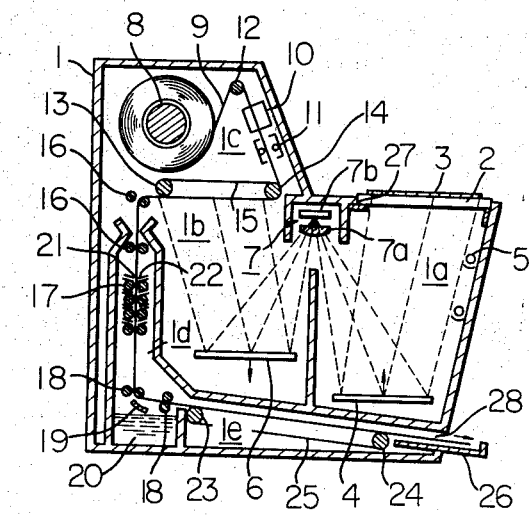

For a better understanding of the invention, reference is made to the following detailed description of the invention taken in conjunction with the accompanying drawing wherein:

FIG. 1 is a side sectional view of a variable magnification exposure device according to the present invention, showing the device in a high magnification condition; and FIG. 2 is a view similar to FIG. 1 but showing the device in a lower magnification condition.

A glass plate 2 is fixed at an upper aperture 27 of a housing 1 of a reproduction apparatus for placement of an original 3 thereon. The inside of the housing 1 is divided into five parts, that is, a first optical path chamber 1a, a second optical path chamber 1b, a roller chamber 1c, a developing chamber 1d, and a drying chamber 1e. In the first optical path chamber 1a, there are provided a first movable reflection mirror 4 and illumination light sources 5 with reflection shades; in the second optical path chamber 1b, a second movable reflection mirror 6; and a lens 7 is fixed at the middle of the chambers 1a and 1b. The lens 7 is an optical system consisting of a lens 7a and a reflection mirror 7b. The first movable reflection mirror 4, the second movable reflection mirror 5 and the reflection mirror 7b are set parallel to the original surface, and the first movable reflection mirror 4 and the second movable reflection mirror 6 are movable in opposite vertical directions. In the roller chamber 1c, there is provided a roller shaft 8 on which a roll of photosensitive paper 9 is mounted for rotation. In the path of the photosensitive paper 9, there are provided a film cutter for cutting the paper 9, a charger 11 for charging the paper 9 through corona discharge, a guide roller 12, and belt pulleys 13 and 14 on which a guide belt 15 runs. In the developing chamber 1d, pairs of feeder rollers 16, pairs of developer rollers 17 and pairs of squeegee rollers 18 are mounted for rotation, and a guide plate 19 is fixed which guides the photosensitive paper 9. The lower part of the chamber 1d is filled with liquid developer 20 which is led upward by a pump means (not shown in the drawing) and discharged from injection holes 21 on the developer rollers 17 so as to form developer pools between the respective pairs of developer rollers 17, and surplus developer flows down. The developer thus circulates and it is usable repeatedly. In the drying chamber 1e, belt pulleys 23 and 24 are mounted for rotation and a guide belt 25 runs on the belt pulleys 23 and 24 as a guide for the photosensitive paper 9. A paper receiver 26 is provided at the lower part of an aperture 28 of the housing 1. Further, outside the housing 1 are electric parts such as a transformer and a drive motor (not shown in the drawing), which motor drives the belt pulleys 13, 14, 23, and 24, the feeder rollers 16, the developer rollers 17 and the squeegee rollers 18 to move the photosensitive paper 9.

The exposure device of the present invention has the construction as described above and wherein the photosensitive paper 9 is drawn out by a suitable drive mechanism, sensitized by the charger 11, cut by the cutter 10, and led to an end of the second optical path chamber 1b. When the original surface is illuminated from the inside by the illumination light sources 5, the image of the original is reflected by the first movable reflection mirror 4, passes through the lens 7a, is reflected by the reflection mirror 7b, passes through the lens 7a again, is reflected by the second movable reflection mirror 6, and is focused onto the photosensitive paper 9. The optical path from the original to the photosensitive paper is of W-shape. When the exposure is finished, the illumination light sources 5 are turned off, and the photosensitive paper 9 is developed by the developer injected on the developer rollers 17 while the developer attached to the paper is removed by the squeegee rollers 18, and the paper 9 is discharged onto the paper receiver 26.

Considering the state when the first movable reflection mirror 4 and the second movable reflection mirror 6 respectively have moved from the position shown in FIG. 1 to the position shown in FIG. 2 in the direction shown by arrow A, the distance between the original surface and the lens becomes greater while the distance between the lens and the photosensitive paper surface becomes smaller so that the magnification becomes lower than that in the state shown in FIG. 1. During this movement, moreover, if the original surface and the photosensitive paper surface are aligned with each other with respect to the lens 7a, any magnification is obtainable between the two states shown in FIGS. 1 and 2.

The present invention makes it possible to vary the magnification without the movement of the original and photosensitive paper but with the movement of the first and the second movable reflection mirrors provided in the reproduction path. In this device, therefore, the structure is simple and the movable parts can be made compact. Further, the device is strong in structure and is quite easy to handle, because the movable parts do not appear outside the housing.

What is claimed is:

1. A reproduction apparatus having a variable magnification exposure device comprising a mounting table for an original having a housing with an aperture therein surmounted by a transparent plate, said housing including partition means therein dividing the interior of said housing into a first optical path chamber, a second optical path chamber, a photosensitive paper chamber and a developer chamber, a light source positioned in said first optical path chamber to illuminate said original, a first movable reflection mirror in said first optical path chamber to reflect an image of the original, a second movable reflection mirror positioned in said second optical path chamber facing the surface of the photosensitive paper, and a reproduction lens system comprising a lens and a plane mirror behind said lens fixed in the housing between the first and second optical path chambers, said lens system being positioned between said first and second mirrors to transmit the image from the first mirror to the second mirror, said first and second movable reflection mirrors being respectively movable towards and away from said reproduction lens system in opposite directions to each other so that variable magnification of reproduction can be obtained.

2. Apparatus as claimed in claim 1 wherein said first and second movable mirrors and said plane mirror of the lens system are parallel to the original.

3. Apparatus as claimed in claim 1 wherein said light source in said first optical chamber is offset from the optical axis between the original and the first reflection mirror.

4. Apparatus as claimed in claim 1 wherein said optical system is above said reflection mirrors to provide a W-shape optical path from the original to the photosensitive paper.

References Cited
UNITED STATES PATENTS

| | | |
|---|---|---|
| 2,333,369 | 11/1943 | Glickman. |
| 2,487,671 | 11/1949 | Pratt et al. _____ 355—66 |
| 2,725,800 | 12/1955 | Dewhurst _____ 355—66 X |
| 3,124,484 | 3/1964 | Magnusson _____ 355—11 X |

JOHN M. HORAN, Primary Examiner

KENNETH C. HUTCHISON, Assistant Examiner

U.S. Cl. X.R.

355—60, 66